(12) United States Patent  
Honda (10) Patent No.: US 8,585,295 B2
(45) Date of Patent: Nov. 19, 2013

(54) ROLLING BEARING (75) Inventor: Shigeki Honda, Tokyo (JP)

(73) Assignee: Eagle Industry Co., Ltd. (JP)

( * ) Notice: Subject to any disclaimer, the term of this patent is extended or adjusted under 35 U.S.C. 154(b) by 0 days.

(21) Appl. No.: 13/579,139

(22) PCT Filed: Jul. 4, 2011

(86) PCT No.: PCT/JP2011/065254
§ 371 (c)(1),
(2), (4) Date: Aug. 15, 2012

(87) PCT Pub. No.: WO2012/005202
PCT Pub. Date: Jan. 12, 2012

(65) Prior Publication Data
US 2012/0314984 A1    Dec. 13, 2012

(30) Foreign Application Priority Data

Jul. 5, 2010   (JP) .................................. 2010-152868

(51) Int. Cl.
*F16C 19/00* (2006.01)
*F16J 15/43* (2006.01)
(52) U.S. Cl.
USPC ............................ 384/446; 277/302; 384/462
(58) Field of Classification Search
USPC ................... 384/446, 462; 277/302, 410–412
See application file for complete search history.

(56) References Cited

U.S. PATENT DOCUMENTS 5,704,613 A * 1/1998 Holtkamp .................... 277/302
7,129,609 B1 * 10/2006 Mikhalev et al. .............. 310/90.5

FOREIGN PATENT DOCUMENTS

| JP | 56070130 A * | 6/1981 | |
| JP | 60076053 | 4/1985 | .............. F16C 33/10 |
| JP | 63101520 | 5/1988 | .............. F16C 33/82 |
| JP | 11166597 | 6/1999 | .............. F16C 33/66 |
| JP | 2003254446 | 9/2003 | .............. F16J 15/43 |
| JP | 2011/065254 | 8/2011 | .............. F16C 33/66 |
| SU | 655858 A * | 4/1979 | |
| SU | 781469 B * | 11/1980 | |
| SU | 817352 B * | 3/1981 | |

OTHER PUBLICATIONS

International Search Report issued for PCT/JP2011/065254, dated Aug. 23, 2011 (4 pgs).
PCT Notification of Transmittal of Translation of the International Preliminary Report on Patentability, dated Feb. 21, 2013 (6 pgs).

* cited by examiner

*Primary Examiner* — Phillip A Johnson
(74) *Attorney, Agent, or Firm* — Hayes Soloway P.C.

(57) ABSTRACT

A rolling bearing used in a power transmission device for transmitting power such as turning force, includes a magnet for holding in a lubrication portion of the rolling bearing. A lubricating magnetic fluid for lubricating the lubrication portion is provided on at least one side of an outer race of the rolling bearing, and an annular yoke made of a magnetic material loosely fitted to a rotating shaft is provided on the opposite side of said magnet relative to said outer race.

7 Claims, 11 Drawing Sheets

ROLLING BEARING

TECHNICAL FIELD

The present invention relates to a rolling bearing and, more specifically, to a rolling bearing employing a magnetic fluid suitable for use in a vacuum field for a device for manufacturing semiconductors, FPD, solar cells, and the like.

BACKGROUND ART

In semiconductor manufacturing devices and the like, for example, a wafer is arranged inside a reaction chamber held in a high vacuum state by a vacuum pump, a reaction gas is introduced, and a thin film is formed using CVD or the like. A work piece has to be transported inside the reaction chamber in a sealed state. In a transporting mechanism used to perform such a task, there has to be a complete, air-tight partition inside the reaction chamber between the arm portion actually holding the work piece and the drive mechanism for transmitting power from outside of the reaction chamber to the arm portion. Also, the generation of dust and the like has to be maximally suppressed on the reaction chamber side. As a result, a drive mechanism is desired for the arm portion inside the reaction chamber which does not generate abrasion powder, lubricant mist, and the like.

Figure 10:
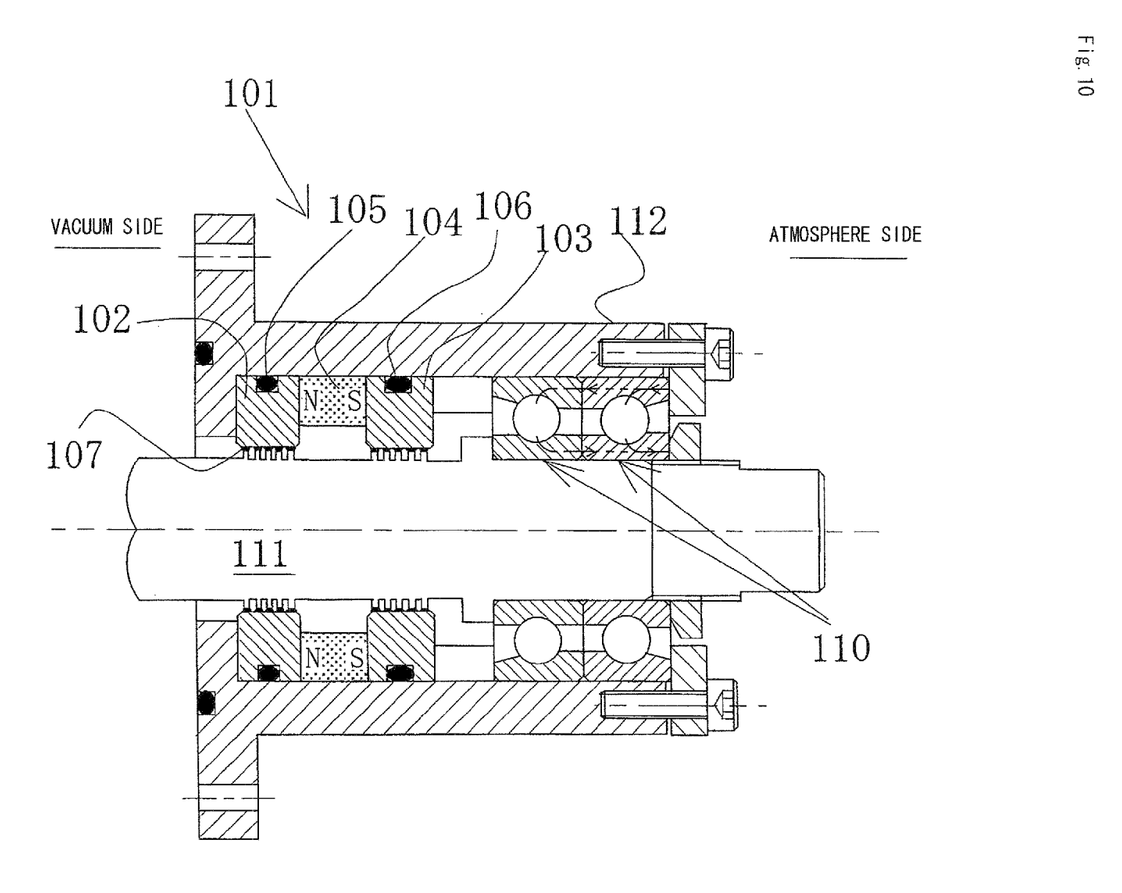
FIG. 10 is a front cross-sectional view of Prior Art 1.

In such semiconductor manufacturing devices, a magnetic fluid sealing device such as the one shown in FIG. 10 is used. This magnetic fluid sealing device uses magnetic circuit forming means composed of a pair of pole pieces 102, 103 serving as magnetic pole pieces, and a magnet 104 serving as magnetic force generating means interposed between the pair of pole pieces 102, 103. The pair of pole pieces 102, 103 is installed in a housing 112 via O rings 105, 106 for improving the sealing properties; and a magnetic circuit is formed by the pole pieces 102, 103, the magnet 104, magnetic fluid 107, and a shaft 111 made of a magnetic material. The magnetic fluid 107 is held between the pole pieces 102, 103 and a plurality of ring-shaped protruding ends formed in the shaft 111, and a sealing function is provided for holding the vacuum side, which is the side to be sealed, in a vacuum state (referred to below as "Prior Art 1").

A bearing 110 serving as a bearing section is arranged on the atmosphere side of such a magnetic fluid sealing device 101. The bearing 110 is typically arranged on the atmosphere side of the magnetic fluid sealing device 101, as the device is averse to dust generated by the bearing 110. An angular bearing or the like can be used as the bearing 110, and grease is often used as the lubricant for this bearing 110.

However, in Prior Art 1, the grease usually mixes with the thickeners in the base oil, and this causes some oil separation. This case becomes more pronounced at higher temperatures. When the bearing is of a single-supported-end type as shown in FIG. 10, the separated oil flows out of the bearing 110, mixes with the magnetic fluid 107, and causes the magnetic fluid 107 to deteriorate. A problem is presented in that the pressure resistance and vacuum properties are adversely affected, and the life of the magnetic fluid sealing device 101 is reduced (referred to below as the "Problem 1").

Also, since the separated oil flows out from the bearing 110 on the atmosphere side and dries out, torque is increased. This may damage the bearing in the worst case. Further, when grease is added to the bearing, the device has to be disassembled. This imposes a cumbersome operation.

In a dual-supported-side-type magnetic fluid sealing device in which a bearing is arranged on the vacuum side, Problem 1 occurs as with a single-supported-side-type bearing. A further problem is presented in that bubbles and moisture are discharged into the vacuum, which degrades the vacuum quality inside the vacuum chamber, and pressure fluctuations to occur (referred to below as "Problem 2").

In view of Problem 1 mentioned above, there is known a device in which an oil receiving portion curving downward on the housing side is provided on the upper surface of the pole piece on the atmosphere side. When the grease experiences some oil separation in the bearing and the separated oil flows out from the bearing, it is collected in the oil receiving portion in the bottom portion of the bearing to prevent the oil from admixing with the magnetic fluid (referred to below as "Prior Art 2;" e.g., refer to Patent Document 1).

Figure 11:
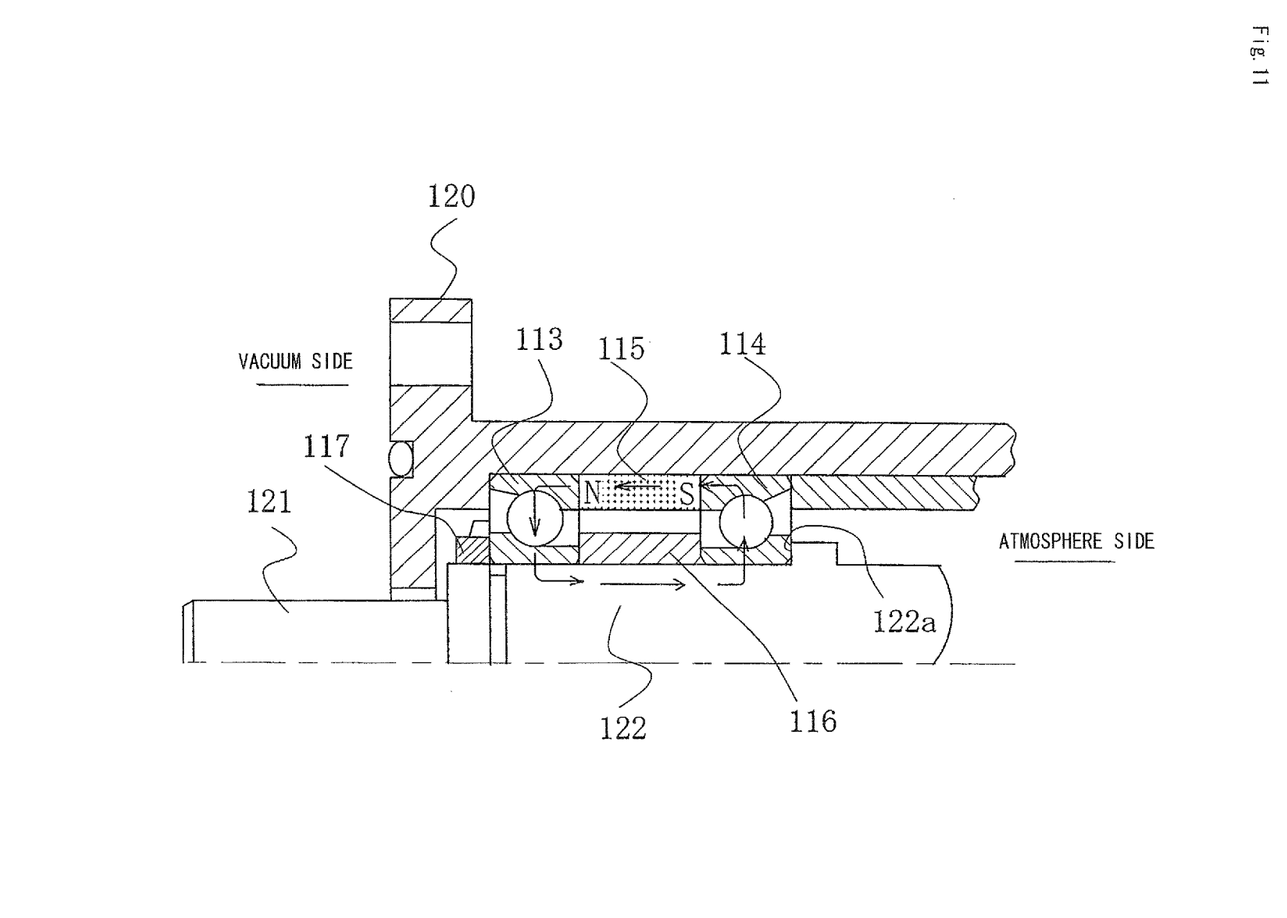
FIG. 11 is a front cross-sectional view of Prior Art 3.

Also, in view of Problem 2 mentioned above, there is known a device in which, as shown in FIG. 11, magnetic fluid is used instead of grease as a lubricant for first and second ball bearings 113, 114 rotatably supporting the rotary output shaft 121 in a rotary transmission device for transmitting power such as turning force and the like between a vacuum side and an atmosphere side partitioned in airtight fashion by a partitioning wall 120 (referred to below as "Prior Art 3;" e.g., refer to Patent Document 2). Prior Art 3 has an annular first spacer 115 interposed between the outer races of the first and second ball bearings 113, 114, an annular second spacer 116 interposed between the inner races, an annular stepped surface 122a, and a nut 117, whereby the position in the axial direction of the outer race and the inner race of the first and second ball bearings 113, 114 are determined. In order to constitute a magnetic circuit, the first spacer 115 is formed from a ferromagnet such as ferritic or martensitic stainless steel, the axial ends are magnetized to create an N pole and an S pole, and at least a shaft portion 122 of the rotary output shaft 121 is formed from a magnet. In addition, the ball bearings 113, 114 are also made of a commonly used metal magnetic material, the second spacer 116 is made of a non-magnetic material, and the periphery of the contact portions of the ball bearings 113, 114 is formed in a state of being covered by a magnetic fluid.

PRIOR ART DOCUMENTS

Patent Documents

Patent Document 1: Japanese Laid-open Patent Publication No. 2003-254446
Patent Document 2: Japanese Laid-open Patent Publication No. 11-166597

DISCLOSURE OF THE INVENTION

Problems to be Solved by the Invention

In Prior Art 2, the magnetic fluid does not degrade because admixing with oil is prevented, pressure resistance and vacuum properties are not affected, and the life of the magnetic fluid sealing device is extended. However, under vacuum conditions, bubbles and moisture contained in the oil stored in the oil receiving portion are discharged into the vacuum, resulting in a problem in that the vacuum quality inside the vacuum chamber is degraded.

Figure 8:
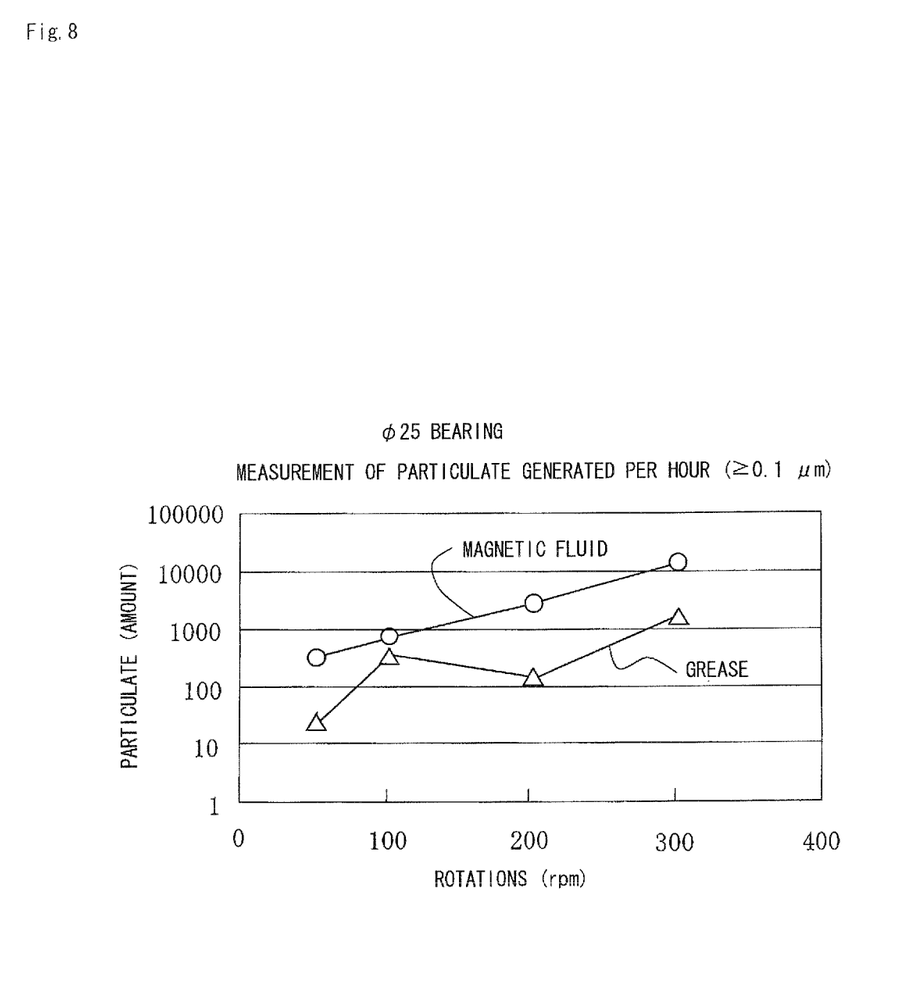
FIG. 8 is a graph showing a measurement of the amount of particulate generated per hour when grease is used as the lubricant for an ordinary rolling bearing, and when a magnetic fluid is used as the lubricant and the magnetic fluid is immobilized by a magnetic circuit using magnets.
Figure 9:
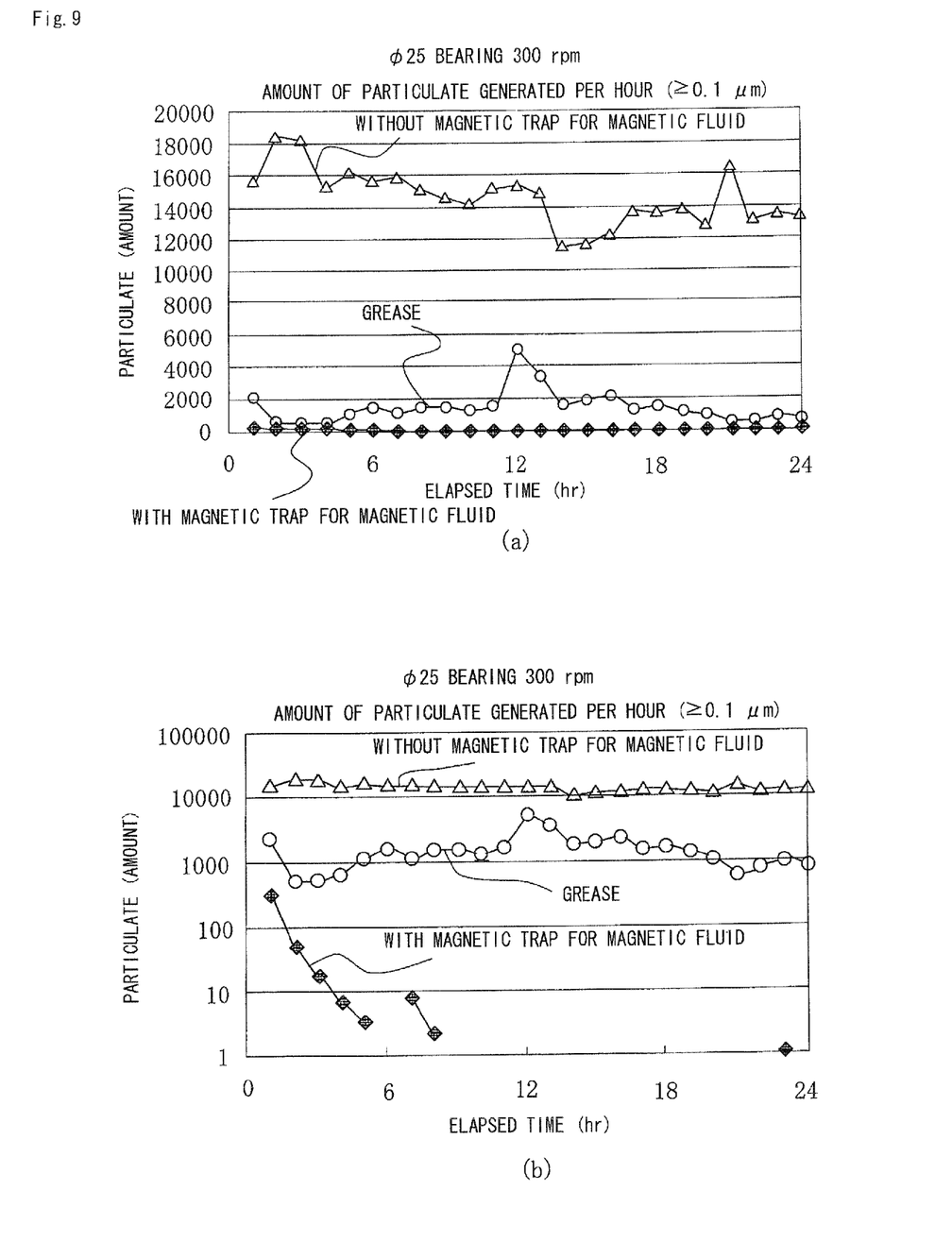
FIG. 9 is a graph showing a measurement of the amount of particulate generated per hour over the elapsed time when grease is used as the lubricant for an ordinary rolling bearing, when a magnetic fluid is used as the lubricant and the magnetic fluid is immobilized by a magnetic circuit using magnets, and when a magnetic fluid is used as the lubricant, the magnetic fluid is immobilized by a magnetic circuit using magnets, and a magnetic trap (magnets and yoke) is installed according to the present invention.

Also, as in Prior Art 3, there is an expectation that particulate such as fine abrasive powder generated in the contact portions of the ball bearings will be reduced by immobilizing a lubricating magnetic fluid using a magnetic circuit using a magnet. However, in actual experiments, as shown in FIG. 8 and FIG. 9, a fairly large amount of particulate is generated compared to a case in which grease is used as the lubricant.

However, the test is set up in an environment such that in a case in which grease is used as the lubricant, a conventional shield is provided for the bearings so that particulate is unlikely to be generated, and such that in a case in which a magnetic fluid is used as the lubricant, a shield is not provided for the bearings and a magnet with weak magnetic force (a weak magnetic field) is used so that particulate is likely to be generated.

An object of the present invention is to solve the problems described above by using a lubricating magnetic fluid as the lubricant for a rolling bearing, immobilizing the lubricating magnetic fluid using a magnetic circuit in which a magnet is employed, and providing a magnetic trap on at least one side of the rolling bearing in order to prevent the generation of mist and particulate, prevent vacuum quality deterioration on the vacuum side and pressure fluctuations, and prevent magnetic fluid sealing device deterioration, and alternatively to eliminate problems such as high-temperature sagging and high torque due to the use of grease.

Means of Solving the Problems

In order to achieve the object mentioned above, a first aspect of the present invention is a rolling bearing used in a power transmission device for transmitting power such as turning force, characterized in that a magnet for holding in a lubrication portion of the rolling bearing a lubricating magnetic fluid for lubricating the lubrication portion is provided on at least one side of an outer race of the rolling bearing, and an annular yoke made of a magnetic material loosely fitted to a rotating shaft is provided on the opposite side of said magnet relative to said outer race.

In the first aspect described above, the generation of mist and particulate is prevented, pressure fluctuations and vacuum quality deterioration on the vacuum side are prevented, and magnetic fluid sealing device deterioration is prevented; or problems such as high-temperature sagging and high torque due to the use of grease can be eliminated.

A second aspect of the present invention is a rolling bearing according to the first aspect, characterized in that the rotary shaft is formed from a magnetic material, and a magnetic circuit produced when the lubricating magnetic fluid is retained by the lubrication portion is formed by the magnet, the yoke, and the rotating shaft, as well as an inner race, a ball, and an outer race of the rolling bearing.

In the second aspect described above, a magnetic circuit can be formed sufficiently and easily.

A third aspect of the present invention is a rolling bearing according to the first aspect, characterized in that the rotary shaft is formed from a magnetic material or a non-magnetic material, and a magnetic circuit produced when the lubricating magnetic fluid is retained by the lubrication portion is formed by the magnet and the yoke, as well as an inner race, a ball, and an outer race of the rolling bearing.

An advantage of the third aspect described above is that the material of the rotary shaft is not limited to a magnetic material.

A fourth aspect of the present invention is a rolling bearing according to any of the first through third aspects, characterized in that a cross-sectional profile of the yoke has an I-shape.

In the fourth aspect described above, the yoke can be easily manufactured.

A fifth aspect of the present invention is a rolling bearing according to any of the first through third aspects, characterized in that a cross-sectional profile of the yoke has an L-shape, a vertical portion of the L-shape contacts a magnet, and a horizontal portion of the L-shape is disposed so as to face a surface of the rotary shaft.

A sixth aspect of the present invention is a rolling bearing according to the fifth aspect, characterized in that an uneven portion is formed on a face of the horizontal portion of the L-shaped yoke, the face opposing the surface of the rotary shaft.

In the fifth aspect and the sixth aspect described above, particulate and the like can be trapped very efficiently.

A seventh aspect of the present invention is a rolling bearing according to any of the first through sixth aspects, characterized in that a projecting portion is provided on a side of an annular yoke facing a magnet, a plurality of cylindrical or rectangular recessed portions is provided in a circumferential direction in the projecting portion, the recessed portions opening toward the outer race side of the roiling bearing, and a magnet being fitted into each of the recessed portions.

In the seventh aspect described above, dimensional precision of the magnets is not required when the yoke is manufactured with dimensional precision, a rolling bearing with a simple structure can be installed with dimensional precision, or this can be easily applied to an existing rolling bearing.

Effect of the Invention

The rolling bearing of the present invention exhibits the following exceptional effects.

(1) The generation of mist and particulate is prevented, pressure fluctuations and vacuum quality deterioration on the vacuum side are prevented, and magnetic fluid sealing device deterioration is prevented, or problems such as high-temperature sagging and high torque due to the use of grease can be eliminated by having a magnet for holding in a lubrication portion of the rolling bearing a lubricating magnetic fluid for lubricating the lubrication portion be provided on at least one side of an outer race of the rolling bearing, and by having an annular yoke made of a magnetic material loosely fitted to a rotating shaft be provided on the opposite side of the magnet relative to the outer race.

(2) A magnetic circuit can be formed sufficiently and easily by having the rotary shaft be formed from a magnetic material, and a magnetic circuit produced when the lubricating magnetic fluid is retained by the lubrication portion be formed by the magnet, the yoke, and the rotating shaft, as well as an inner race, a ball, and an outer race of the rolling bearing.

(3) An advantage is presented in that the material of the rotary shaft is not limited to a magnetic material by having the rotary shaft be formed from a magnetic material or a non-magnetic material, and by having a magnetic circuit produced when the lubricating magnetic fluid is retained by the lubrication portion be formed by the magnet and the yoke, as well as an inner race, a ball, and an outer race of the rolling bearing.

(4) The yoke can be easily manufactured by having the cross-sectional profile of the yoke describe an I-shape.

(5) Particulate and the like can be trapped very efficiently by having the cross-sectional profile of the yoke describe an h-shape, a vertical portion of the L-shape contact a magnet, a horizontal portion of the L-shape be disposed so as to face a surface of the rotary shaft, and an uneven portion be formed on a face of the horizontal portion of the L-shaped yoke, the face opposing the surface of the rotary shaft.

(6) Dimensional precision of the magnets is not required when the yoke is manufactured with dimensional precision, and a rolling bearing of a simple structure can be installed with dimensional precision, or readily applied to an existing rolling bearing, by having a projecting portion be provided on a side of an annular yoke facing a magnet, a plurality of cylindrical or rectangular recessed portions be provided in a circumferential direction in the projecting portion, the recessed portions opening toward the outer race side of the rolling bearing, and a magnet fitted into each of the recessed portions.

BEST MODE FOR CARRYING OUT THE INVENTION

Embodiments of the rolling bearing of the present invention will now be described in detail with reference to the drawings. The present invention is not intended to be interpreted as being limited to these embodiments; various changes, modifications, and improvements can be added based on the knowledge of persons skilled in the art without departing from the scope of the present invention.

1st Embodiment

Figure 1:
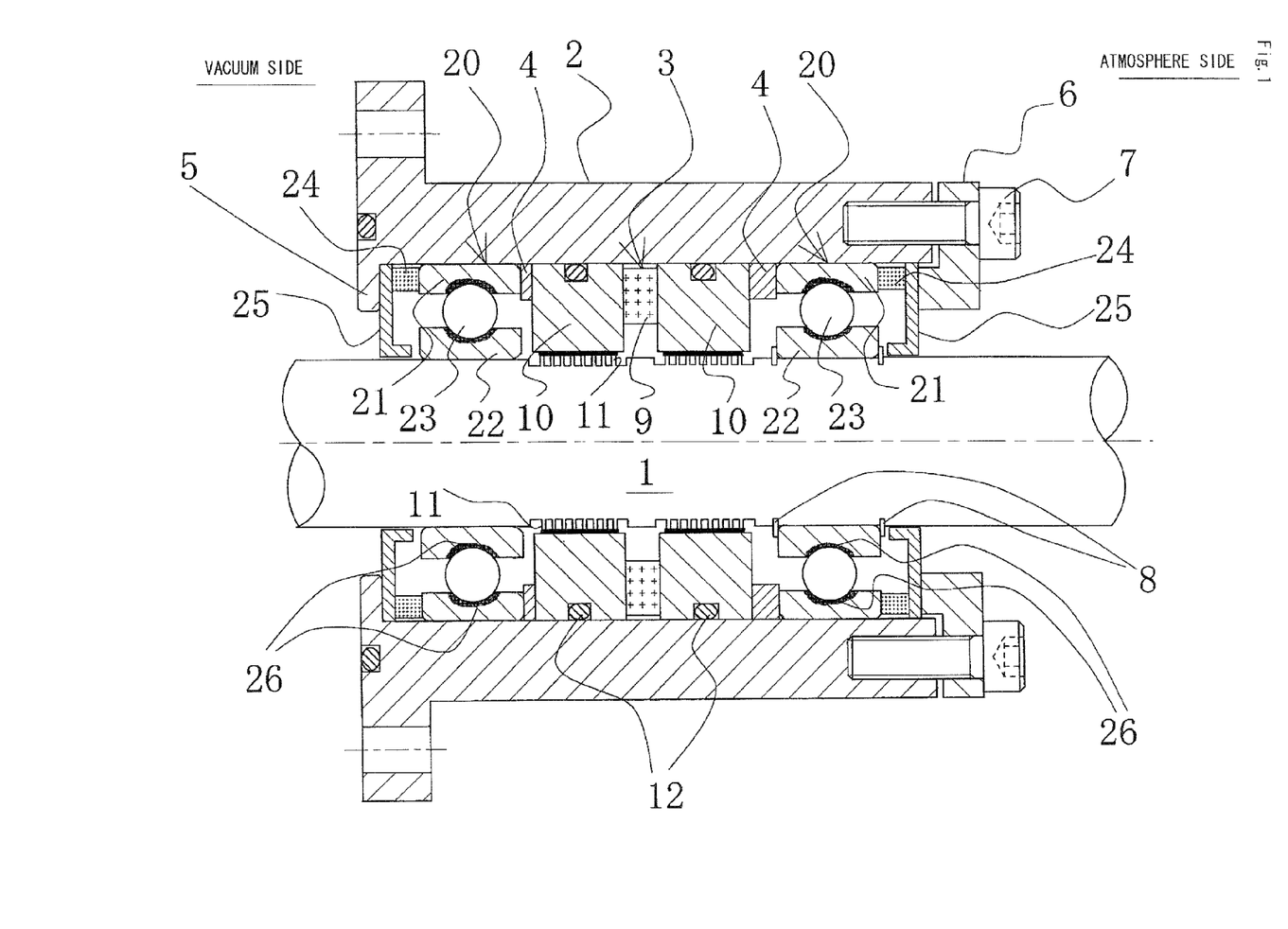
FIG. 1 is a front cross-sectional view showing an example in which a rolling bearing according to a first embodiment of the present invention is applied to a bearing device with a magnetic fluid seal.
Figure 2:
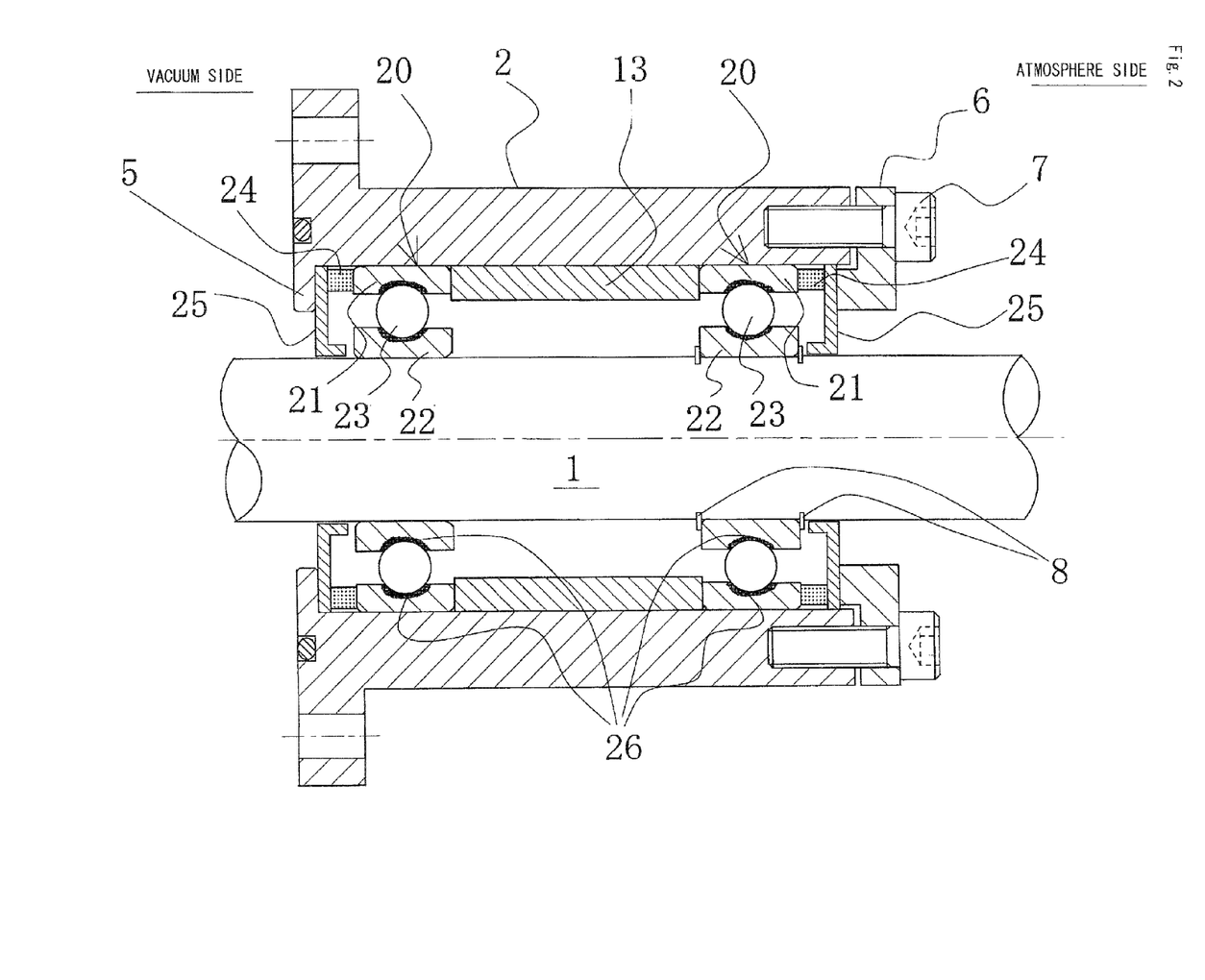
FIG. 2 is a front cross-sectional view showing an example in which a rolling bearing according to a first embodiment of the present invention is applied to a bearing device without a magnetic fluid seal.
Figure 3:
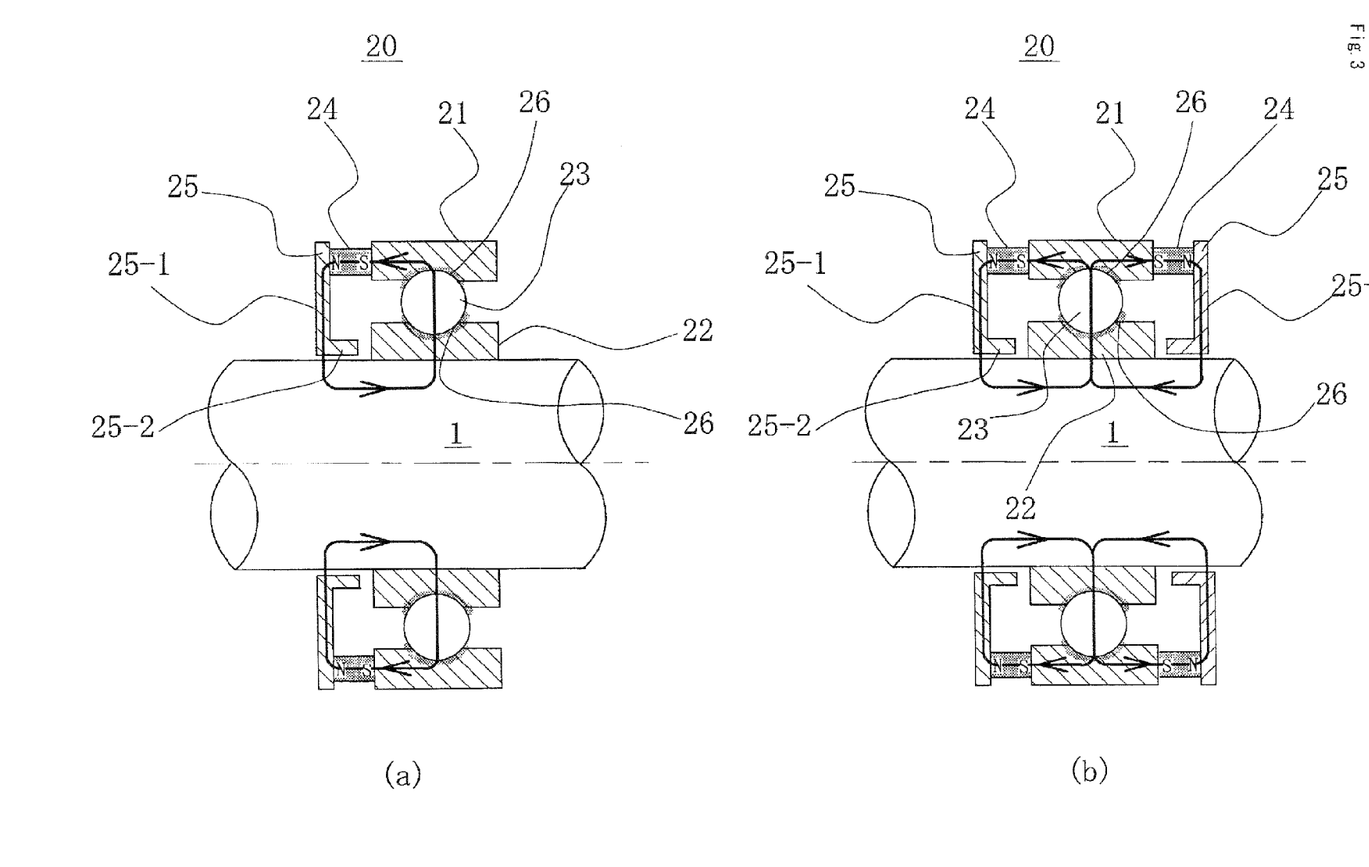
FIG. 3 is a diagram used to describe a rolling bearing according to a first embodiment of the present invention in which (a) is a front cross-sectional view showing a case in which a magnetic trap is provided on one side of the rolling bearing, and (b) is a front cross-sectional view showing a case in which a magnetic trap is provided on both sides of the rolling bearing.

FIG. 1 is a front cross-sectional view showing an example in which a rolling bearing according to a first embodiment of the present invention is applied to a bearing device with a magnetic fluid seal, and FIG. 2 is a front cross-sectional view showing an example in which a rolling bearing according to the first embodiment of the present invention is applied to a bearing device without a magnetic fluid seal. Also, FIG. 3 is a front cross-sectional view used to describe a rolling bearing 20 according to a first embodiment of the present invention.

In FIGS. 1 and 2, the vacuum side is on the left and the atmosphere side is on the right. However, as shall be apparent, a rolling bearing of the present invention can also have the atmosphere on both sides, or the vacuum on both sides.

In FIG. 1, a bearing device is installed between a housing 2 and a rotary shaft 1, the bearing device sealing the space between the rotary shaft 1 and the housing 2, and rotatably supporting the rotary shaft 1. A magnetic fluid seal 3 is arranged in a central portion inside the housing 2, rolling bearings 20, 20 are arranged on both sides of the magnetic fluid seal 3, and a spacer 4 made of a non-magnetic material is interposed between an outer race 21 or inner race 22 of the rolling bearing 20 and the magnetic fluid seal 3 on the vacuum side, and between the outer race 21 of the rolling bearing 20 and the magnetic fluid seal 3 on the atmosphere side.

A step portion 5 is formed on the left end of the housing 2 on the inner peripheral side; the rolling bearing 20 comes into contact with the step portion 5; and the spacer 4, the magnetic fluid seal 3, the spacer 4, and the rolling bearing 20 are arranged in the stated order towards the right, all being immobilized using a retaining ring 6 and a bolt 7 so that pressure is applied on the step portion 5.

A retaining ring 8 is provided on the rotary shaft 1 corresponding to the position of the rolling bearing 20 on the atmosphere side, and the inner race 22 of the rolling bearing 20 is positioned. The magnetic fluid seal 3 is composed of a magnet 9, and pole pieces 10, 10 arranged on both sides of the magnet. A plurality of protruding portions 11 is formed on the outer peripheral surface of the rotary shaft 1 with respect to the pole pieces 10, 10. An O ring 12 is installed on the outer peripheral surface of the pole piece 10, 10, so that the space between the outer peripheral surface of the pole piece and the inner peripheral surface of the housing 2 is sealed.

In FIG. 2, a bearing device is installed between the housing 2 and the rotary shaft 1, the bearing device sealing the space between the housing 2 and the rotary shaft 1, and rotatably supporting the rotary shaft 1. A spacer 13 made of a non-magnetic material is arranged in the central portion inside the housing 2, and the rolling bearings 20, 20 are arranged on both sides of the spacer 13. A step portion 5 is formed on the left end of the housing 2 on the inner peripheral side; a rolling bearing 20 comes into contact with the step portion 5; and the spacer 13 and the rolling bearing 20 are arranged in the stated order towards the right, all being immobilized using a retaining ring 6 and a bolt 7 so that pressure is applied on the step portion 5.

A retaining ring 8 is provided on the rotary shaft 1 corresponding to the position of the rolling bearing on the atmosphere side, and the inner race 22 of the rolling bearing 20 is positioned.

In FIG. 1 and FIG. 2, the rolling bearing 20 according to the first embodiment of the present invention is a bearing in which are employed bail bearings, rolling bearings, or another rolling element. An outer race 21 is immobilized on the housing 2, and an inner race 22 is immobilized on the rotating shaft 1. Balls 23 are fitted between the outer race 21 and the inner race 22.

Magnets 24 are provided on the vacuum-side surface of the outer race 21 of the rolling bearing 20 on the vacuum side, and on the atmosphere side of the outer race 21 of the rolling bearing 20 on the atmosphere side. In addition, an annular yoke 25 made of a magnetic material and loosely fitted to the rotary shaft 1 is provided on the opposite side of the magnets 24 relative to the outer races 21. In FIG. 1, having a magnetic trap composed of the magnet 24 and the yoke 25 provided on both the vacuum side and the atmosphere side of the rolling bearings 20 enables the release of particulate in the vacuum chamber and the atmosphere to be prevented. In FIG. 1, a magnetic trap is only provided on one side of the rolling bearings 20. A magnetic fluid seal 3 is provided on the side without a magnetic trap. These trap the particulate between the pole piece 10 holding the magnetic fluid and the plurality of protruding portions 11 on the rotary shaft 1. When the lubricating magnetic fluid used in the rolling bearings 20 is different from the magnetic fluid in the magnetic fluid seal and mixing of the two has to be prevented, a magnetic trap is preferably provided on both sides of the rolling bearings 20. The reason for having a magnetic trap provided only on the vacuum side and atmosphere side of the rolling bearings 20 in FIG. 2 is that the two rolling bearings are set apart from each other, and even if particulate is released on the vacuum side and the atmosphere side, it will be trapped and prevented from flowing out by the magnetic traps on both ends. Thus, the design can call for the provision of a magnetic trap on one or both sides of the rolling bearings 20.

A lubricating magnetic fluid 26 is used as the lubricant for the rolling bearing 20 instead of grease, and this lubricates the portions to be lubricated. In order to suitably lubricate the portions to be lubricated over a long period of time, there must be formed a magnetic circuit for holding the lubricating magnetic fluid in the portions to be lubricated.

In order to form a magnetic circuit in this embodiment, a rotary shaft 1 is formed from a magnetic material. The outer race 21, inner race 22, and balls 23 in the rolling bearing 20 are also magnetic and made of commonly used metals.

Broadly speaking, there are three types of magnetic fluid: water-based magnetic fluids, hydrocarbon oil-based magnetic fluids, and fluorine-oil-based magnetic fluids. Hydrocarbon oil-based magnetic fluids and fluorine-based magnetic fluids are used in the rolling bearings 20 of the present invention because they have a low vapor pressure and are unlikely to evaporate in a high vacuum at high temperatures.

Therefore, in the present invention, lubricating magnetic fluid especially refers to a hydrocarbon oil-based magnetic fluid or fluorine-based magnetic fluid.

Also, a permanent magnet made of an organic material or the like filled with, for example, a metal or a magnetic powder can be used as the magnet 24.

FIG. 3 is a diagram used to describe the rolling bearing installed in FIG. 1 and FIG. 2 in which (a) is a front cross-sectional view of a case in which a magnetic trap composed of the magnet 24 and yoke 25 is provided on one side of the rolling bearing, and (b) is a front cross-sectional view of a case in which a magnetic trap composed of the magnet 24 and yoke 25 is provided on both sides of the rolling bearing.

The rotary shaft 1 is formed from a magnetic material, the outer race 21, inner race 22, and balls 23 for the rolling bearing 20 are also magnetic, and a magnetic circuit is formed in the directions indicated by the arrows. In other words, a magnetic circuit is formed from the magnet 24, which is a permanent magnet, via the yoke 25, the rotary shaft 1, the inner race 22, the balls 23, and the outer race 21, before returning to the magnet 24. As a result, the lubricating magnetic fluid 26 is held between the balls 23 and the outer race 21, and between the balls 23 and the inner race 22.

The yoke 25 is ring-shaped and has an inner diameter slightly larger than the diameter of the rotary shaft 1 so as to be loosely fitted on the rotary shaft 1. The cross-sectional shape is L-shaped. The portion contacting the magnet 24 is the vertical portion 25-1 of the L-shape, and the portion facing the surface of the rotary shaft 1 is the horizontal portion 25-2 of the L-shape. The horizontal portion 25-2 extends toward the inner race 22.

Since the yoke 25 is arranged on the vacuum side of the magnet 24, that is, on the vacuum side relative to the balls 23, particulate from magnetic fluid generated by the turning of the balls 23 is trapped by the yoke 25, and the particulate is prevented from infiltrating to the vacuum side. There is a slight gap between the yoke 25 and the surface of the rotary shaft 1, and particulate is believed to infiltrate the vacuum side through this gap. However, since a magnetic circuit is formed between the horizontal portion 25-2 of the yoke 25 and the surface of the rotary shaft 1, the particulate is efficiently trapped and cannot enter the vacuum side.

2nd Embodiment

Figure 4:
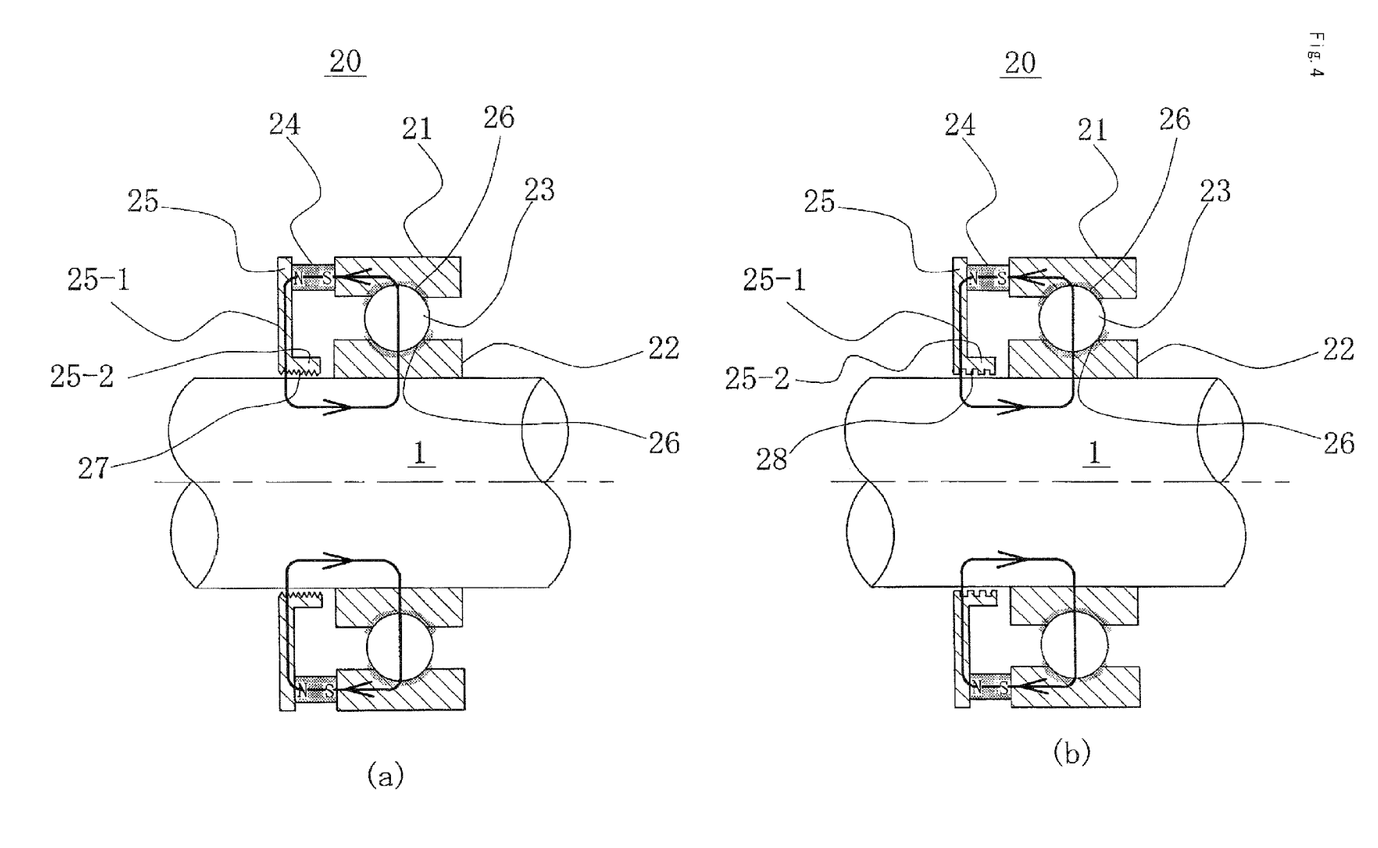
FIG. 4 is a front cross-sectional view used to describe a rolling bearing according to a second embodiment of the present invention.

FIG. 4 is a front cross-sectional view used to describe a rolling bearing 20 according to a second embodiment of the present invention.

The basic structure of the rolling bearing 20 according to the second embodiment is similar to that according to the first embodiment. In FIG. 4, components denoted by the same reference numerals as those in FIG. 3 are identical to those in FIG. 3. The following is primarily an explanation of the portions differing from those in the first embodiment.

In FIG. 4, the ring-shaped yoke 25 has an L-shaped cross-section as in the first embodiment. The portion contacting the magnet 24 is the vertical portion 25-1 of the L-shape, and the portion facing the surface of the rotary shaft 1 is the horizontal portion 25-2 of the L-shape. The horizontal portion 25-2 extends toward the inner race 22.

In FIG. 4 (a), a sawtooth-shaped uneven portion 27 is formed on the surface of the horizontal portion 25-2 of the yoke 25 facing the surface of the rotary shaft 1.

In FIG. 4 (b), a square-thread-shaped uneven portion 28 is formed on the face of the horizontal portion 25-2 of the yoke 25 facing the surface of the rotary shaft 1.

The particulate can be efficiently trapped as a consequence of the sawtooth-shaped uneven portion 27 or the square-thread-shaped uneven portion 28 being formed on the face of the horizontal portion 25-2 of the L-shape facing the surface of the rotary shaft 1.

3rd Embodiment

Figure 5:
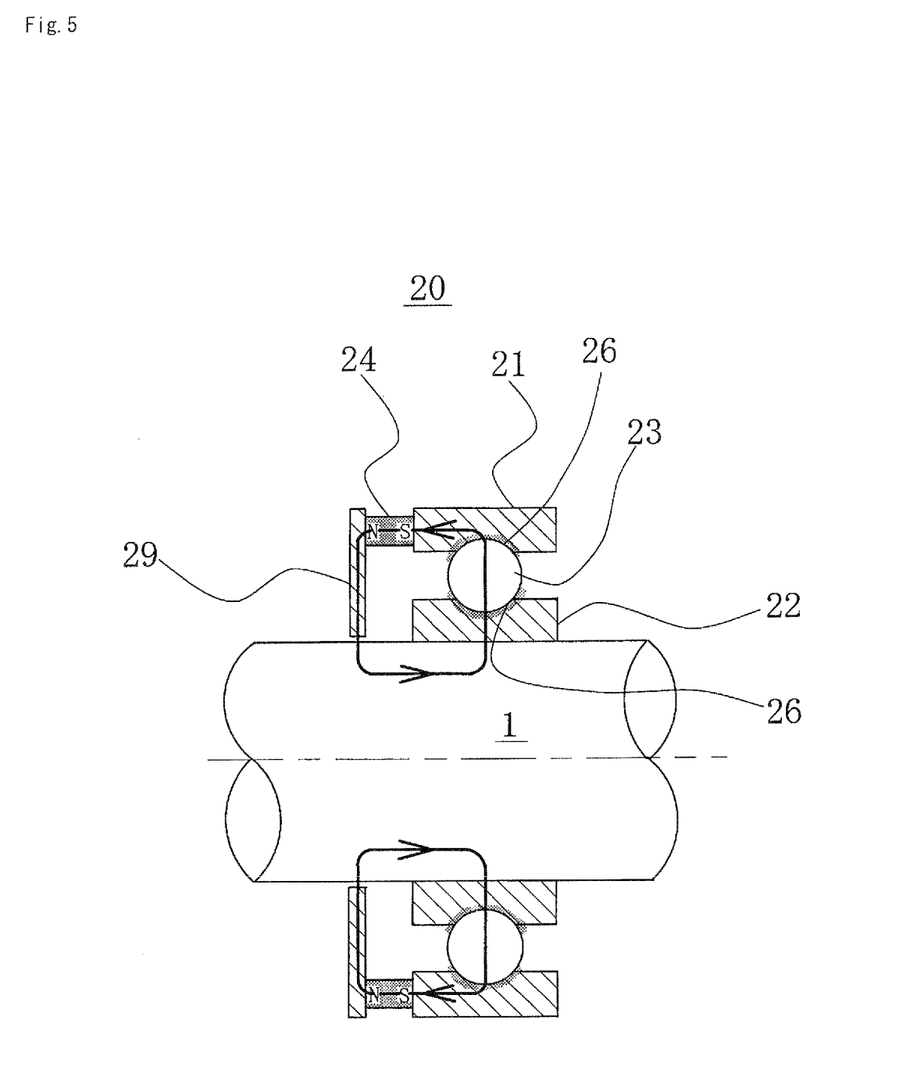
FIG. 5 is a front cross-sectional view used to describe a rolling bearing according to a third embodiment of the present invention.

FIG. 5 is a front cross-sectional view used to describe a rolling bearing 20 according to a third embodiment of the present invention.

The basic structure of the rolling bearing 20 according to the third embodiment is similar to that according to the first embodiment. In FIG. 5, components denoted by the same reference numerals as those in FIG. 4 are identical to those in FIG. 4.

A ring-shaped yoke 29 in FIG. 5 has an I-shaped cross-section.

This makes the yoke 29 easier to manufacture.

4th Embodiment

Figure 6:
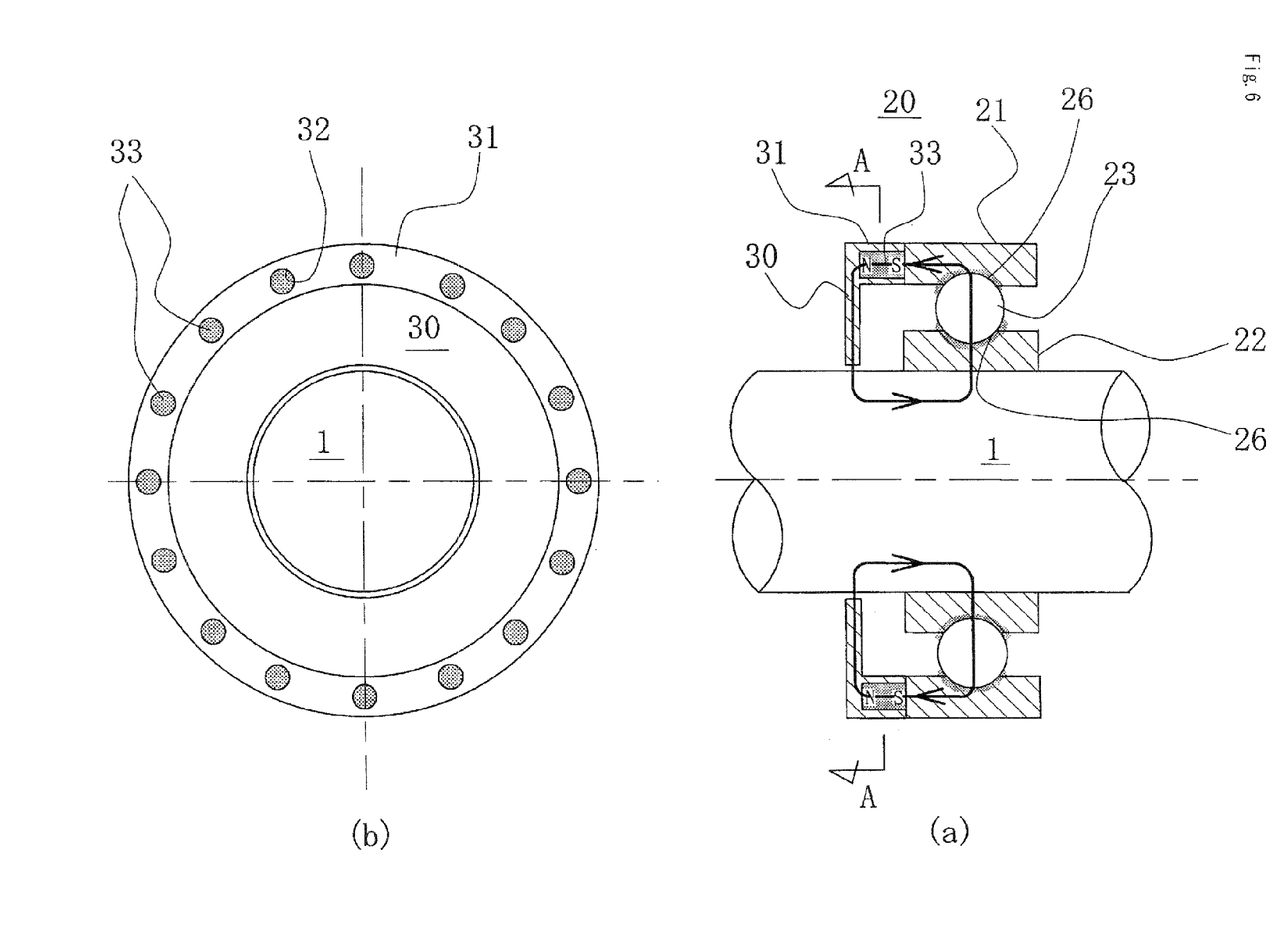
FIG. 6 is a view used to describe a rolling bearing according to a fourth embodiment of the present invention in which (a) is a front cross-sectional view, and (b) is a cross-sectional view from A-A in (a)

FIG. 6 is a view used to describe a rolling bearing 20 according to a fourth embodiment of the present invention in which (a) is a front cross-sectional view, and (b) is a cross-sectional view from A-A in (a).

The basic structure of the rolling bearing 20 according to the fourth embodiment is similar to that according to the third embodiment. In FIG. 6, components denoted by the same reference numerals as those in FIG. 5 are identical to those in FIG. 5.

In FIG. 6, a ring-shaped yoke 30 has an I-shaped cross-section as in the third embodiment. A projecting portion 31 is provided on a side of the yoke 30 facing a magnet 33, a plurality of cylindrical or rectangular recessed portions 32 is provided in a circumferential direction in the projecting portion 31 opening toward the outer race side of the rolling bearing, and a cylindrical magnet 33 is fitted into each recessed portion 32.

By having the magnets 33 held by the yoke 30 in this structure, dimensional precision of the magnets 33 is not required when the yoke 30 is manufactured with dimensional precision, and a rolling bearing 20 with a simple structure can be disposed with dimensional precision, or readily applied to an existing rolling bearing.

5th Embodiment

Figure 7:
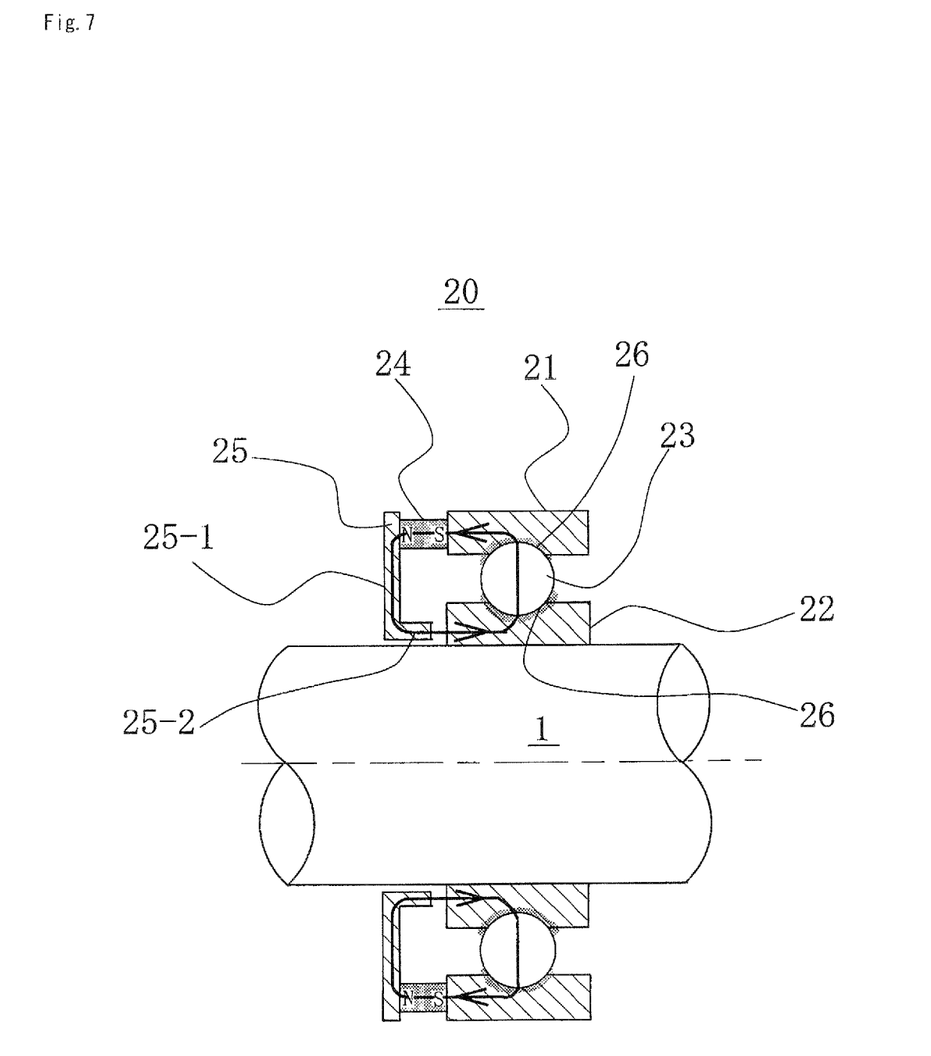
FIG. 7 is a front cross-sectional view used to describe a rolling bearing according to a fifth embodiment of the present invention.

FIG. 7 is a front cross-sectional view used to describe a rolling bearing 20 according to a fifth embodiment of the present invention.

The basic structure of the rolling bearing 20 according to the fifth embodiment is similar to that according to the first embodiment. In FIG. 7, components denoted by the same reference numerals as those in FIG. 4 are identical to those in FIG. 4. The following is a description of the components differing from those in the first embodiment.

In FIG. 7, the magnetic circuit for holding the lubricating magnetic fluid in the portions to be lubricated is formed in the directions indicated by the arrows. In other words, a magnetic circuit is formed from the magnet 24, which is a permanent magnet, via the yoke 25, the inner race 22, the balls 23, and the outer race 21, before returning to the magnet 24. As a result, the rotary shaft 1 can be made from a non-magnetic material, or the horizontal portion 25-2 of the ring-shaped yoke 25 facing the surface of the rotary shaft 1 can be formed so as to be set apart from the surface of the rotary shaft 1.

As a result, an advantage is presented in that the material of the rotary shaft 1 is not limited to a magnetic material.

FIG. 8 is a graph showing a measurement of the amount of particulate generated per hour when grease is used as the lubricant for an ordinary rolling bearing, and when a magnetic fluid is used as the lubricant and the magnetic fluid is immobilized by a magnetic circuit using magnets (referred to below as "a case in which there is no magnetic trap using magnetic fluid").

In this measurement test, the trapping effect of a magnetic trap was confirmed when magnetic fluid was immobilized using a magnetic circuit. In order to do so, a weak magnetic field was established and a state conducive to particulate formation was produced.

When a bearing having a diameter of 25 mm was caused to rotate in a range from 50 to 300 rpm, and measurements were made, the per-hour number of particles having a size equal to or greater than 0.1 μm became larger as the rotational speed increased. When there was no magnetic trap using magnetic fluid, the number of particles generated at all speeds was greater than a case in which grease was used.

FIG. 9 is a graph showing a measurement of the amount of particulate generated per hour over the elapsed time in a case in which grease is used as the lubricant for an ordinary rolling bearing, in a case in which there is no magnetic trap using magnetic fluid, and in a case in which a magnetic fluid is used as the lubricant, the magnetic fluid is immobilized by a magnetic circuit using magnets, and an annular yoke (magnetic trap) according to the present invention is installed (referred to below as a "case in which there is a magnetic trap using magnetic fluid"). In this measurement, a bearing having a diameter of 25 mm was used, and was caused to rotate at 300 rpm.

In this measurement test, the trapping effect of a magnetic trap was confirmed when magnetic fluid was immobilized by a magnetic circuit. In order to do so, a weak magnetic field was established and a state conducive to particulate formation was produced.

FIGS. 9 (a) and (b) indicate the same measurement results, but FIG. 9(b) is a semilogarithmic graph which allows the number of particles generated when a magnetic trap with magnetic fluid is used and when grease is used to be more easily viewed.

As shown in FIG. 9 (a), the number of particles generated per hour is mostly unrelated to the passage of time when a magnetic trap with magnetic fluid is not used. When grease is used as a lubricant for a typical rolling bearing, the number of particles generated per hour is approximately one-eighth the number generated when a magnetic trap with magnetic fluid is not used. However, the number of particles generated rises suddenly before or after twelve hours have elapsed. Even within another small time frame, it is evident that approximately 1,000 particles are generated each hour.

In contrast, when there is a magnetic trap with the magnetic fluid, as is clear from FIG. 9 (b), approximately 500 particles per hour are generated immediately after the start of operation. However, this number declines rapidly as time passes. After several hours of operation, the number is reduced to several particles per hour. Afterwards, hardly any particulate is generated.

It is clear from the measurement results that the particulate is reliably trapped by the yoke in a rolling bearing in which an annular yoke (magnetic trap) of the present invention has been installed.

KEY TO THE SYMBOLS

1 Rotating shaft
2 Housing
3 Magnetic fluid seal
4 Spacer
5 Step portion
6 Retaining ring
7 Bolt
8 Retaining ring
9 Magnet
10 Pole piece
11 Protruding portion
12 O ring
13 Spacer
20 Rolling bearing
21 Outer race
22 Inner race
23 Ball
24 Magnet
25 Yoke
26 Lubricating magnetic fluid
27 Sawtooth-shaped uneven portion
28 Square-thread-shaped uneven portion
29 Yoke
30 Yoke
31 Projecting portion
32 Recessed portion
33 Magnet

The invention claimed is:

1. A rolling bearing used in a power transmission device for transmitting power such as turning force, wherein a magnet for holding in a lubrication portion of said rolling bearing a lubricating magnetic fluid for lubricating said lubrication portion is provided on at least one side of an outer race of the rolling bearing, and an annular yoke having an L-shaped profile and made of a magnetic material is loosely fitted to a rotating shaft on an opposite side of the magnet relative to said outer race, wherein a vertical portion of said L-shaped profile contacts the magnet, and a horizontal portion of the L-shape profile is disposed so as to face a surface of the rotary shaft.

2. The rolling bearing according to claim 1, wherein the rotary shaft is formed from a magnetic material, and a magnetic circuit produced when the lubricating magnetic fluid is retained by the lubrication portion is formed by the magnet, the yoke, and the rotating shaft, as well as an inner race, a ball, and the outer race of the rolling bearing.

3. The rolling bearing according to claim 1, wherein the rotary shaft is formed from a magnetic material or a non-magnetic material, and a magnetic circuit produced when the lubricating magnetic fluid is retained by the lubrication portion is formed by the magnet and the yoke, as well as an inner race, a ball, and the outer race of the rolling bearing.

4. The rolling bearing according to claim 1, wherein an uneven portion is formed on a face of the horizontal portion of the L-shaped yoke, the face opposing the surface of the rotary shaft.

5. The rolling bearing used in a power transmission device for transmitting power such as turning force, wherein a first magnet for holding in a lubrication portion of said rolling bearing a lubricating magnetic fluid for lubricating said lubrication portion is provided on at least one side of an outer race of the rolling bearing, and an annular yoke loosely fitted to a rotating shaft is provided on the opposite side of said first magnet relative to said outer race, wherein a projecting portion is provided on a side of the annular yoke facing the first magnet, a plurality of cylindrical or rectangular recessed portions is provided in a circumferential direction in said projecting portion, the recessed portions opening toward an outer race side of the rolling bearing, and a plurality of second magnets is fitted into the recessed portions.

6. The rolling bearing according to claim 5, wherein the rotary shaft is formed from a magnetic material, and a magnetic circuit produced when the lubricating magnetic fluid is retained by the lubrication portion is formed by the first and the second magnets, the yoke, and the rotating shaft, as well as an inner race, a ball, and the outer race of the rolling bearing.

7. The rolling bearing according to claim 5, wherein the rotary shaft is formed from a magnetic material or a non-magnetic material, and a magnetic circuit produced when the lubricating magnetic fluid is retained by the lubrication portion is formed by the first and the second magnets and the yoke, as well as an inner race, a ball, and the outer race of the rolling bearing.

* * * * *

UNITED STATES PATENT AND TRADEMARK OFFICE
CERTIFICATE OF CORRECTION

PATENT NO. : 8,585,295 B2  Page 1 of 1
APPLICATION NO. : 13/579139
DATED : November 19, 2013
INVENTOR(S) : Honda It is certified that error appears in the above-identified patent and that said Letters Patent is hereby corrected as shown below:

References Cited, FOREIGN PATENT DOCUMENTS, title page, Col. 2, line 6, add missing reference:
--JP   3121223   12/1991 .......... F16C 33/66--.

In the Claims

Claim 1, Col. 11, line 11, "L-shape" should be --L-shaped--.

Signed and Sealed this
Twenty-sixth Day of August, 2014

Michelle K. Lee
*Deputy Director of the United States Patent and Trademark Office*